United States Patent [19]

Jigamian et al.

[11] 4,431,245
[45] Feb. 14, 1984

[54] CONNECTOR FOR BATTERY PACK

[75] Inventors: Gregory Z. Jigamian, Topanga; Grennie M. Uchida, Culver City, both of Calif.

[73] Assignee: Christie Electric Corporation, Torrance, Calif.

[21] Appl. No.: 338,310

[22] Filed: Jan. 11, 1982

[51] Int. Cl.³ .............................................. H01R 13/24
[52] U.S. Cl. ................................. 339/91 R; 339/49 B; 339/58; 339/75 M
[58] Field of Search ................ 339/75 R, 75 M, 91 R, 339/48, 49 R, 49 B, 58, 176 M

[56] References Cited

U.S. PATENT DOCUMENTS

| | | | |
|---|---|---|---|
| 3,892,464 | 7/1975 | Griffin | 339/49 R |
| 3,973,179 | 8/1976 | Weber et al. | 339/91 R |
| 4,050,003 | 9/1977 | Owings et al. | 339/58 |
| 4,063,683 | 12/1977 | Jones | 339/91 R |
| 4,083,620 | 4/1978 | Burgin | 339/91 R |
| 4,103,983 | 8/1978 | Morrison et al. | 339/91 R |

FOREIGN PATENT DOCUMENTS

| | | | |
|---|---|---|---|
| 1221836 | 6/1960 | France | 339/49 R |
| 1455081 | 11/1976 | United Kingdom | 339/48 |

*Primary Examiner*—John McQuade
*Attorney, Agent, or Firm*—Harris, Kern, Wallen & Tinsley

[57] ABSTRACT

A connector for making electrical circuit connections between two components, such as a battery pack and an adapter for connecting the battery pack to a charger and to an electrically powered device such as a portable T.V. camera. A housing with base and projecting body having spaced parallel contact spaces with contacts therein, and an adapter with corresponding contacts spaces and contacts. The components include mating ribs and grooves and slide channels for guiding engagement of the commponents and bringing the contacts into compression sliding contact with each other.

6 Claims, 8 Drawing Figures

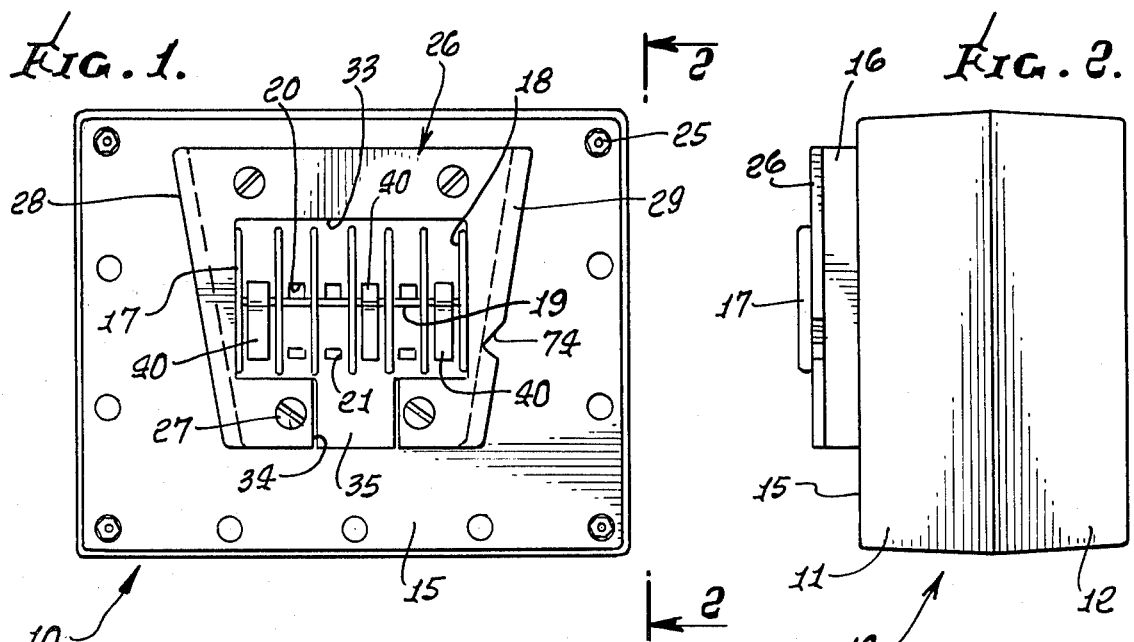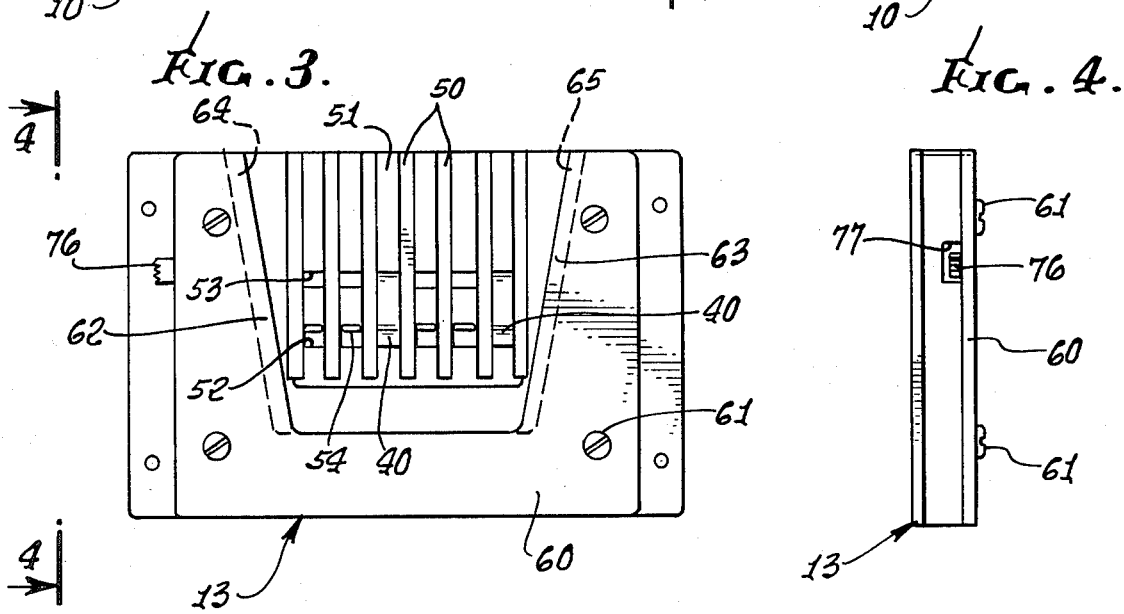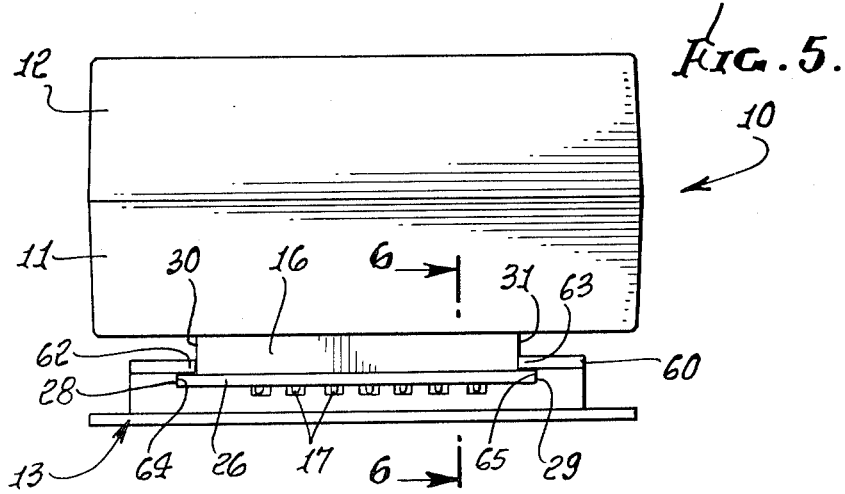

CONNECTOR FOR BATTERY PACK

BACKGROUND OF THE INVENTION

This invention relates to battery operated devices and more particularly, to a new and improved connector for battery operated devices.

Today many electrical devices are desirably portable, and the hand-held television camera is a typical example. Such devices are powered from battery packs which have to be recharged from time to time. When operating in the field, a cameraman will have several charged battery packs and when one is discharged, a second will be quickly substituted. Hence provision must be made for connecting the battery pack to a battery charger and also for quickly and easily connecting the battery pack and disconnecting the battery pack from the camera or other electrically powered device.

Various forms of connectors have been utilized in the past, and it is an object of the present invention to provide a new and improved connector for such use. A further object is to provide such a connector which may be quickly connected and disconnected, one which is self-aligning so as not to require operator attention, and one which provides a positive lock mounting. An additional object is to provide such a connector which permits rapid change of battery pack while insuring positive electrical and mechanical locking, with self wiping contacts.

These and other objects, advantages, features and results will more fully appear in the course of the following description.

SUMMARY OF THE INVENTION

A connector for a battery pack or the like including housing and adapter. Typically the batteries are contained in the housing, and the adapter provides for connection directly or by way of cable to a battery charger and to the electrically powered device. The housing has a body with a plurality of spaced parallel ribs defining contact spaces therebetween and additional transverse aligned ribs in the contact spaces with contacts carried in the contact spaces with the contacts overlying corresponding transverse ribs and having an oblique contact surface, preferably below the tops of the parallel ribs. The adapter has corresponding spaced parallel grooves for slidingly receiving the parallel ribs, and includes transverse aligned ribs in the contact spaces, and similar contacts carried in the contact spaces. The adapter is slideable onto the housing with the contact spaces aligned bringing the oblique contact surfaces of the contacts into compressing sliding engagement.

The connector includes inner engaging elements on the adapter and housing for aligning the two components, and preferably includes a latch for latching the components together.

BRIEF DESCRIPTION OF THE DRAWINGS

FIG. 1 is a top view of a battery pack housing incorporating the presently prefered embodiment of the invention;

FIG. 2 is a side view of the housing of FIG. 1 taken along the line 2—2;

FIG. 3 is a bottom view of an adapter for use with the housing of FIG. 1;

FIG. 4 is a side view of the adapter of FIG. 3 taken along the line 4—4;

FIG. 5 is a front view showing the adapter mounted on the housing;

DESCRIPTION OF THE PREFERRED EMBODIMENT

Figure 7:
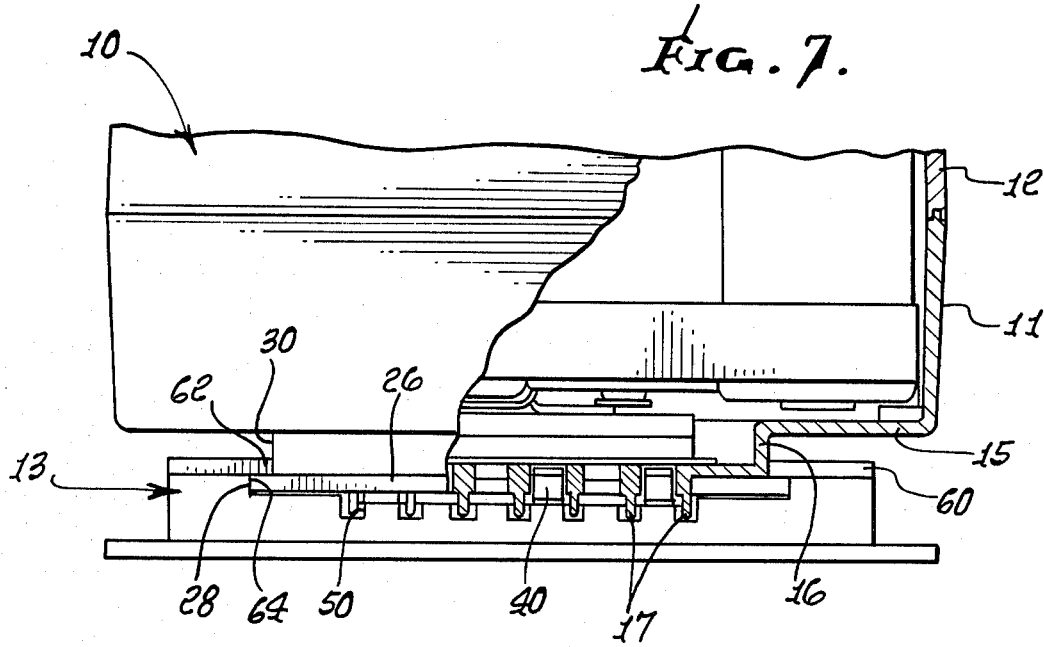
FIG. 7 is an enlarged partial view similar to that of FIG. 5, with a portion of the housing broken away.

In the embodiment illustrated, a conventional battery pack is enclosed in a two piece housing 10 comprising an upper housing member 11 and a lower housing member 12. An adapter 13 is provided for slidingly mounting on the housing 10. An adapter may be connected to a battery charger or to an electrically powered device such as a T.V. camera by a cable, or an adapter maybe mounted directly on a battery charger or on a camera, or otherwise as desired.

The upper housing member 11 has a base 15 with a body 16 projecting upward therefrom. Ribs 17 are provided on the body 16, with the ribs disposed parallel with each other, defining contact spaces 18 therebetween. Additional ribs 19 are positioned in the contact spaces 18 transverse to the ribs 17, with the ribs 19 aligned with each other. Openings 20, 21 are provided in each of the contact spaces.

The housing members 11, 12 typically are plastic moldings, which are joined together by screws 25. The body 14 and ribs 17, 19 maybe molded integrally with the housing member 11.

A plate 26, typically a metal plate, is mounted on the body 16 by means of screws 27. The plate has projecting opposite edges 28, 29 which overhang the body, defining slide channels 30, 31 between the plate 26 and the base 15. Preferably, the body and plate have frusto-triangular shapes, as shown in FIG. 1, for mating engagement with similar shapes in the adapter 13 to be described.

The ribs 17 of the body 16 project through an opening 33 in the plate 26. Preferably a slot 34 is provided in the plate 26, leaving a portion 35 of the body exposed, as seen in FIG. 1. This portion 35 is in alignment with one or more of the contact spaces 18.

Figure 6:
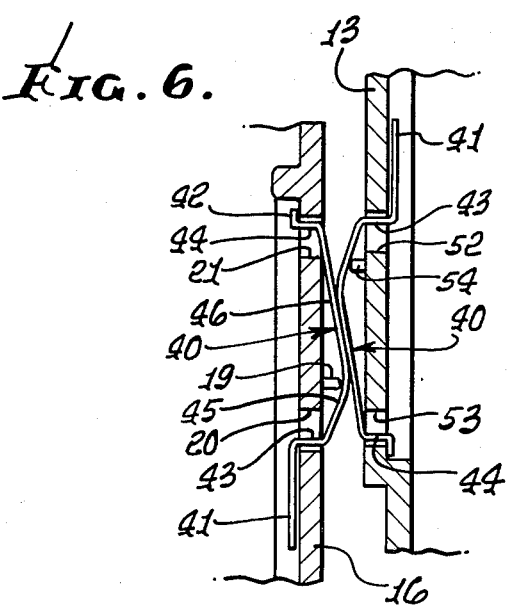
FIG. 6 is an enlarged partial sectional view taken along the line 6—6 of FIG. 5.

Electrical contacts are mounted in the contact spaces, with the number and position of the contacts depending upon the particular circuitry involved. Three such contacts 40 are shown in FIG. 1. The electrical contacts in the housing and in the adapter preferably have the same configuration and one will be described in detail. Referring to FIG. 6, the contact 40 has planar ends 41, 42, with parallel intermediate sections 43, 44, and oblique sections 45, 46. A contact is inserted by placing the longer end 41 through the opening 20 and then placing the shorter end 42 through the opening 21.

The adapter 13 has parallel grooves 50 which define contact spaces 51 therebetween, with openings 52, 53 similar to openings 20, 21, respectively, and with transverse aligned ribs 54 similar to the ribs 19. Contacts 40 are mounted in the contact spaces 51 in the same manner as in the housing 10, with contacts positioned as desired, depending upon the circuit function of the adapter.

A plate 60, typically a metal plate, is mounted on the adapter 13 by screws 61. The plate has overhanging edges 62, 63 providing slide channels 64, 65 for receiving the edges 29, 28 respectively of the plate 26 of the housing.

Figure 8:
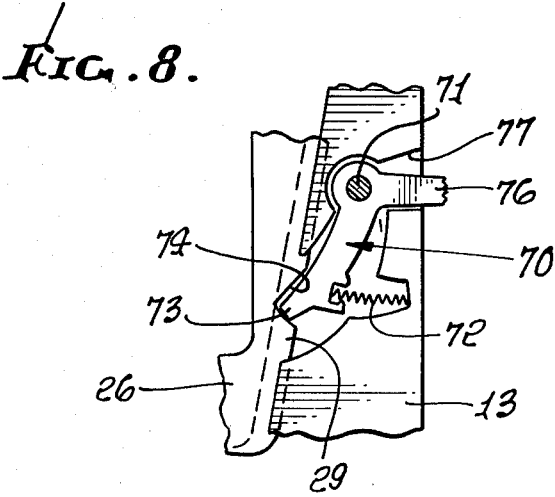
FIG. 8 is an enlarged partial view illustrating the latching mechanism for the housing and adapter.

Means are provided for latching the adapter to the housing and the preferred embodiment is shown in FIG. 8. A latching member 70 is pivotally mounted on a pin 71 in the adapter 13. A spring 72 urges the latching member clockwise as shown in FIG. 8, urging the end 73 of the latching member into a notch 74 in the plate 26 of the housing. Another end 76 of the latching member projects through an opening 77 and permits manual rotation of the latching member counterclockwise as viewed in FIG. 8, compressing the spring 72 and moving the end 73 out of the notch 74. The latching member and spring maybe maintained in place in the adapter 13 by the adapter plate 60.

In use, appropriate wires are attached to the contacts 40, typically by soldering to the ends 41, and these wires are routed as desired. The adapter is slid onto the housing, with the edges 28, 29 of the plate 26 riding in the slide channels 65, 64, respectively. This brings the two components together as shown in FIGS. 5, 6 and 7, with the end 73 of the latching member in the notch 74 of the plate 26. As the two components slide together, the oblique surfaces 46 of opposing contacts slide against each other providing a cleaning action as well as a compression electrical engagement between the contacts. The transverse ribs 19, 54 aid in achieving this wiping action and compression engagement. Desirably, the components are dimensioned so as to provide a snug engagement to maintain the components together. When it is desired to separate the components, the end 76 of the latching member is rotated to move the end 73 out of the notch 74, and one component is moved laterally with respect to the other.

The ribs 17 in the housing preferably project outward beyond the contacts 40, so that the housing with the batteries therein maybe laid down on a metal surface without short circuiting between contacts. This also protects the contacts from a tool or other article being laid on the contacts and shorting them. As the two components are slid together, the contacts 40 of the adapter slide across the plate 26 of the housing and since the plate typically is of metal, there is an opportunity for circuit interconnections. The slot 34 is provided in a plate 26, with the portion 35 of the body 16 therein to provide an insulating path for one or more of the contacts of the adapter to eliminate this problem. The positioning and size of the slot may be varied to accommodate the number and location of adapter contacts to be protected, as desired.

A quick connect and disconnect, self-aligning and positive locking connector is provided with the construction described above. The interengaging ribs and grooves provide for alignment, and the interengaging edges and slide channels maintain spacing between the components, with the oblique surfaces of the contacts having a pressure wiping action to obtain a positive electrical interconnection as well as a secure mechanical engagement.

We claim:

1. In a connector for a battery pack or the like, the combination of:
   a housing including a base and a body projecting from said base;
   a housing plate mounted on said body and having projecting opposite edges defining housing slide channels between said housing plate and base;
   said housing body including a plurality of spaced parallel first ribs defining first contact spaces therebetween, with said first ribs projecting through an opening in said housing plate, and with said housing body including transverse aligned second ribs in said first contact spaces;
   a plurality of first contacts carried in said body in said first contact spaces, with each of said first contacts below said first ribs and overlying the corresponding second rib and having an oblique contact surface;
   an adapter having a plurality of spaced parallel grooves defining second contact spaces therebetween for slidingly receiving said first ribs, and including transverse aligned third ribs in said second contact spaces;
   an adapter plate mounted on said adapter and having projecting opposite edges defining adapter slide channels between said adapter plate and adapter; and
   a plurality of second contacts carried in said adapter in said second contact spaces, with each of said second contacts overlying the corresponding third rib and having an oblique contact surface;
   with said adapter slideable onto said housing with said adapter plate in said housing slide channels and said housing plate in said adapter slide channels bringing said oblique contact surfaces of said first and second contacts into compressing sliding engagement.

2. A connector as defined in claim 1 wherein each of said first and second contacts includes planar opposite ends, parallel intermediate sections perpendicular to said planar ends, and a second oblique surface joining said first oblique contact surface, with said oblique surfaces between said inttermediate sections, and
   wherein each of said first and second contact spaces includes spaced openings for receiving corresponding intermediate sections of a contact.

3. A connector as defined in claim 2 wherein said housing body is of an electrical insulating material and said housing plate is of an electrical conducting material,
   with a slot in said housing plate aligned with at least one of said first contact spaces and exposing said housing body.

4. A connector as defined in claim 1 including latch means for latching said housing and adapter together.

5. A connector as defined in claim 4 wherein said latch means includes a notch in one of said housing plate edges,
   a latching member pivotally mounted in said adapter, and
   spring means urging said latching member into an adapter slide channel for engaging said latching member with said notch,
   said latching member including manually actuable means for compressing said spring means and disengaging said latching member from said notch.

6. In a connector for a battery pack or the like, the combination of:
   a housing including a base and a body projecting from said base;
   said housing body including a plurality of spaced parallel first ribs defining first contact spaces therebetween, and transverse aligned second ribs in said first contact spaces;

a plurality of first contacts carried in said body in said first contact spaces, with each of said first contacts below said first ribs and overlying the corresponding second rib and having an oblique contact surface;

an adapter having a plurality of spaced parallel grooves defining second contact spaces therebetween for slidingly receiving said first ribs, and including transverse aligned third ribs in said second contact spaces; and a plurality of second contacts carried in said adapter in said second contact spaces, with each of said second contacts overlying the corresponding third rib and having an oblique contact surface;

with said housing and adapter including interengagable slide means for sliding said adapter onto said housing bringing said oblique contact surfaces of said first and second contacts into compressing sliding engagement.

* * * * *